Patented May 14, 1935

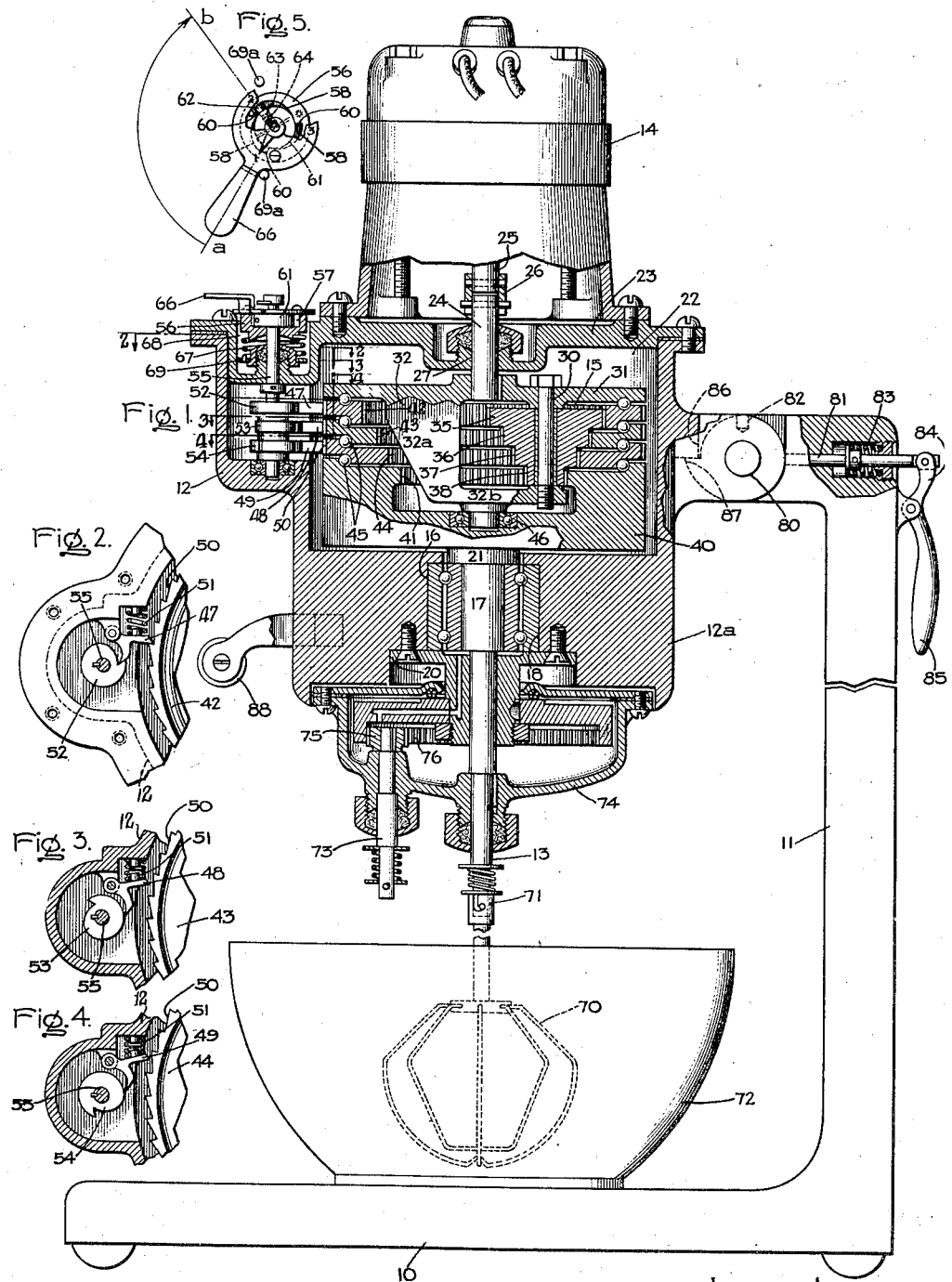

2,001,036

UNITED STATES PATENT OFFICE 2,001,036

MIXING DEVICE AND THE LIKE

David C. Prince, Swarthmore, Pa., assignor to General Electric Company, a corporation of New York Application May 13, 1932, Serial No. 611,170

4 Claims. (Cl. 74—277)

My invention relates to mixing devices and the like, more particularly to power driven mixing devices, and has for its object the provision of an improved device of this character and means whereby the utility of the device is increased and its functions extended.

My invention has as one of its objects the provision of a device of the above character which can be conveniently used to perform a large number of operations commonly necessary in the preparation of food. It is contemplated that the device may be used to beat eggs, make mayonnaise, mix bread and cakes, chop and cut meats and vegetables, operate ice cream freezers, etc.

In carrying my invention into effect in one form thereof, I provide a shaft driven by some suitable power means, such as an electric motor. This shaft is used to operate suitable tools used in the preparation of foods such as stirrers and beaters, choppers and grinders, graters and pulverizers, ice cream freezers, etc.

The operating shaft and its driving motor are arranged to be supported either in a substantially vertical or in a substantially horizontal operating position; suitable locking means are provided to secure these members in each of their operating positions.

By reason of the foregoing arrangement, the motor and shaft can be conveniently used to operate food preparation devices which heretofore have required separate power operating means. Thus, when the shaft is supported in its vertical operating position, it can be used conveniently to operate suitable beating and mixing tools, to beat eggs, make mayonnaise, mix bread and cakes, etc. On the other hand, the device can be used just as conveniently to apply power on a horizontal axis such as is usually required by such tools as meat or vegetable choppers, ice cream freezers, etc.

In addition to the foregoing, I have provided improved means for transmitting power from the operating motor to the driven shaft whereby the latter can be driven at a plurality of operating speeds.

In carrying out this portion of my invention, I provide in addition to the operating or driven shaft a driving shaft. Interposed between the driving shaft and the driven shaft is a suitable planetary gear mechanism including a third shaft arranged to have a planetary motion with respect to the driving shaft. Mounted upon the third shaft are a plurality of gears of varying diameters arranged so that they rotate together and freely on the third shaft. The operating shaft is driven directly by means of a gear which is arranged to mesh with one of the gears on the planetary shaft. Meshing with the remaining of these gears on the third shaft are a plurality of separate and freely rotatable gears. Suitable means are provided for selectively engaging these latter gears so as to prevent their rotation whereby the driven shaft is mechanically connected through the gear mechanism with the driving shaft and is operated at a speed dependent upon which of the gears is stopped.

Furthermore, I provide suitable means for automatically releasing the operating or driven shaft in the event the load imposed on the shaft attains an unsafe magnitude.

For a more complete understanding of my invention reference should be had to the accompanying drawing, in which Fig. 1 is a vertical elevation mainly in section of a mixing device or like apparatus embodying my invention; Figs. 2, 3, and 4 are fragmentary sectional views taken on the lines 2—2, 3—3, 4—4, respectively of Fig. 1; and Fig. 5 is a plan view of a portion of the mechanism shown in Fig. 1.

Referring to the drawing, I have shown my invention in one form as applied to apparatus for handling foods comprising a base 10 on which an upright standard or column 11 is mounted, the latter preferably being formed integrally with the base.

Supported upon this standard 11 is a housing or supporting member 12. And supported by this housing is an operating shaft 13, a motor 14 for rotating the shaft and a planetary gear mechanism 15 interposed between the motor and shaft and constituting a driving connection between them.

The housing 12, as shown, comprises a substantially thick and ruggedly built base portion 12a. Within this base portion is arranged a bearing 16 for receiving the journal 17 of the shaft 13. This bearing, as shown, seats within a recess 18 provided for it in the housing and is secured in its seat by a suitable retaining plate 20. The upper end of the shaft 13, as viewed in Fig. 1, is provided with a retaining thrust bearing 21.

The housing 12 is further provided with a chamber 22 in which the planetary gear train 15 is received. Closing this chamber is a suitable cover member 23. This member also functions to support and secure the driving motor 14.

The driving motor 14 is connected to the shaft 13 through the gear train 15, and a driving shaft 24 connected to the motor shaft 25 by means of a suitable mechanical coupling 26. This shaft 24 is journalled in a bearing 27 provided for it in the cover 23 and functions to directly connect the motor shaft 25 and the gear train 15. The bearing 27 supports the shaft 24 on an axis substantially co-axial with the axis of the shaft 13.

The gear train 15 comprises a shaft 30 supported upon a frame at one side of the axis of rotation of the driving shaft 24 so as to have a planetary motion with respect to this shaft. This frame, as shown, comprises a plate-like member 31 mounted on the shaft 24 and keyed to it so as to rotate with it. The upper end of the shaft 30, as shown, is secured to this plate on one side of the axis of rotation of the plate and the driving shaft 24.

Depending from the plate 30, and preferably formed integrally with it, is an angle shaped arm 32 having a vertical leg 32a, as viewed in Fig. 1, and a horizontal leg 32b. The vertical leg 32a is disposed on the side of the axis of rotation of the driving shaft 24 directly opposite the shaft 30. The arm 32b is projected across the axis of rotation of the driving shaft and, as shown, functions to secure the lower end of the shaft 30.

Mounted to rotate freely upon the shaft 30 is a series of gears 35, 36, 37, and 38. These gears are connected together so as to rotate as a unitary structure upon the shaft 30. The gears may be, and as shown are, formed integrally with each other. It will be observed that the gears 35, 36, 37, and 38 are mounted upon the shaft 30 so as to have a planetary motion with respect to the axis of rotation of the driving shaft 24. The member 32 is made sufficiently massive to counterbalance the weight of the gears 35, 36, 37, and 38.

The gears 35, 36, 37, and 38, as shown, progressively decrease in diameter. The smallest of the gears, that is the gear 38, is used to impart motion directly to the driven shaft 13. For this purpose a member 40 is provided. This member is mechanically connected to rotate with the shaft 13 and, as shown, is provided with an internal gear 41 meshing with the gear 38.

In order to control the speed of rotation of the gear 38 and hence of the member 40, a plurality of internal gears 42, 43, and 44 are provided to mesh with the gears 35, 36, and 37, respectively. The gears 42, 43, and 44 are free to rotate within the chamber 22 on an axis substantially co-axial with the axis of rotation of the shafts 13 and 24. As shown in Fig. 1, these gears are superposed on each other and all three are mounted to rotate on the gear member 40. Interposed between each pair of these members is a ball bearing 45. The member 40 is also provided with a bearing 46 journalling the lower end of the frame 32 for rotation relative to the member 40 and on an axis co-axial with the axis of rotation of the shaft 24.

The gears 42, 43, and 44 can be prevented from rotating by means of latching members 47, 48, and 49 respectively. Each of these latching members is arranged to cooperate with teeth 50 arranged on the outer periphery of its internal gears 42, 43, 44, so as to prevent rotation of the associated member during the normal operation of the device when the latch is engaged.

As shown, the latches are biased to engage their associated teeth by means of compression springs 51. The latches are moved against their spring bias to disengage the teeth 50 by means of cams 52, 53, and 54 respectively.

These cams are secured on an operating shaft 55 and are so arranged upon the shaft that they can be controlled to allow the latches 47, 48, and 49 to selectively engage and lock their associated gears.

Suitable means are provided for moving the shaft 55 to its several controlling positions and for locking the shaft in each of these positions. As shown, this means comprises an operating member 56 provided with a substantially cylindrical chamber 57 in the walls of which three cam surfaces 58 are provided. These cam surfaces terminate in shoulders 60, as clearly shown in Fig. 5.

As shown, the upper end of the shaft 55 projects into the chamber 57 where a disk-shaped head 61 is connected to the shaft.

This head carries a pawl or pin 62 which is slidably mounted in a radial passageway 63 provided for it in the head. The pin 62 is normally biased outwardly of the head into engagement with the cam surfaces 58 provided in the member 56 by means of a compression spring 64.

It will be observed that the foregoing construction constitutes a ratchet-like connection between the shaft 55 and its operating member 56. To advance the shaft through successive steps of its motion it is merely necessary to move the member 56 between its controlling positions a and b. As the member 56 is moved from position a to position b, the detent 60 of the particular cam surface 58 which happens to be in engagement with the pin advances the pin and connected head 61 and shaft 55 with it until eventually when the member 56 reaches position b the next succeeding cam 52, 53, 54 will be moved to release its associated latch to lock its associated gear 42, 43, 44.

The member 56 is advanced from position a to b by means of a manually operable handle 66 secured to the member, and is returned automatically from b to a by means of a torsion spring 67. This spring, as shown (Fig. 1), is received in a chamber 68 defined in the cover 23. The spring is secured at its lower end to a fixed collar 69 and is secured at its upper end to the member 56 so as to always bias the member from position b to position a. It will be observed that the operating head 56 can be returned to position a without disturbing the position of the head 61 and its connected shaft 55, and that when the member 56 arrives at position a the pin 62 will be engaged by another detent 60 so that upon a subsequent operation of the member 56 to position b, the shaft 55 will be advanced through another step of its motion.

If desired suitable stops 69a may be provided at the limiting positions a and b of the path of motion of the arm 66.

It will be observed that when any one of the gears 42, 43, 44 is locked by means of its latch that the locked gear and its associated gears 35, 36, 37 constitute an epicyclic gear train; in other words the latter gear will revolve on its axis and at the same time it will revolve about the axis of the fixed gears 35, 36, 37.

The speeds at which the gears 35, 36, and 37 rotate, and hence the speeds at which the gear 38 and its associate gear 40 and connected shaft 13 rotate, depend upon the particular gear 42, 43, 44 which is locked against rotation. The greatest speed will be imparted to the gear 40 and its connected shaft 13 when the gear 42 is locked, while the lowest speed will be imparted to the shaft 13 when the gear 44 is locked. The gear 43 will give an intermediate speed.

The latching means 47, 48, and 49 are arranged to release their associated gears when the load imposed on the shaft 13 attains a predetermined high value. In the operation of the device it it contemplated that the motor will be driven in such a direction that the plate 31 and the shaft 30 will be driven in a clockwise direction looking down upon these members. It will be observed that this rotation imparted to the shaft 30 and its gears 35, 36, and 37 will tend to rotate the associated gears 42, 43, and 44 in the same direction. When any one of these latter gears is locked, as for example the gear 42, so as to mechanically connect the shaft 13 with its driving shaft 24, it will be observed that the tendency of this gear 42 to rotate in a clockwise direction is opposed by means of the latch 47 (Fig. 2) that is, by means of the compression spring 51. This spring possesses sufficient force to securely lock the gear 42 against rotation when the shaft 13 is operating under normal or under a predetermined load. In the event that this load rises to the predetermined value, the force set up tending to rotate the gear willl become so great that it will overcome the tension of the spring 51 and the latch will be moved to release the gear 42 which will rotate until the force or load imposed on the shaft 13 is reduced to a point below the predetermined value, whereupon the spring 51 will again operate to lock the gear wheel 42 against rotation.

It will be readily understood that when the wheel 42 releases itself, that is, when the latch moves to release it because of the increased load on the shaft 13, the driving connection between the shafts 13 and 24 will be released.

This is an important feature of my invention because it precludes any possibility of over-loading the driving motor or gear mechanism.

It is contemplated that for certain operations such as beating eggs, stirring fruit juices, mixing batter for bread and cake, etc., the operating shaft 13 will be supported for operation in a substantially vertical position, as shown in Fig. 1.

In the operation of the device for these purposes it will be understood that a suitable beater or mixing tool 70 will be secured to the operating shaft 13 in any suitable manner, as by means of a suitable bayonet joint 71, and that the materials to be treated will be placed in a suitable receptacle 72 placed upon and secured to the base 10. The speed at which the tool 70 is rotated can be controlled conveniently by means of the controlling lever 66.

At times it is desirable to subject the food both to a beating and a mixing operation at the same time. For this purpose I have provided a second operating shaft 73 which is arranged to be given a planetary motion with respect to the shaft 13. This shaft 73 is carried by means of a planetary housing 74 which in turn is keyed to rotate with the shaft 13 so that as the shaft 13 is rotated the housing and the shaft 73 will be rotated around the shaft 13 as an axis. At the same time the shaft 73 is given a rotary motion on its own axis by means of a gear 75 secured to the shaft 72 and meshing with an internal gear 76 driven by the shaft 13. These gears are proportioned so that the shaft 73 is rotated at a relatively high speed.

It will be observed that if a tool 70 be attached to the shaft 73 it can be rotated at a high speed on its own axis and at a speed equal to the speed of rotation of the shaft 13 about the latter as an axis.

For such operations as grinding and cutting meat or vegetables or running an ice cream freezer, it is contemplated that the housing 12 will be moved to such a position that the operating shafts 13 and 73 will be supported for operation in a substantially horizontal position. For this purpose, the housing 12 is pivotally secured to the standard 11 by means of a suitable hinge 80 so that it may be rotated from its position shown in Fig. 1 to another position arranged substantially at right angles to the position shown in this figure.

I have provided suitable locking means for securing the housing in this second position. This locking means, as shown, comprises a locking pin 81 arranged to be received in a recess 82 provided for it in the hinge arm of the housing 12. This pin is biased inwardly toward the hinge arm by means of a suitable compression spring 83 so that when the housing 12 is rotated to its second operative position the pin will be automatically pressed into its recess. In order to release the housing, the pin is provided with a suitable retracting member 84 operated by a handle 85.

When the housing is in its position shown in Fig. 1 with the operating shaft vertical it is secured or locked against further downward movement by means of a suitable stop 86 provided on the housing and arranged to engage a ledge or stop 87 provided on the standard 11.

The housing 12 is provided with a handle 88 whereby it can be conveniently moved between its operating positions.

In the horizontal position of the shafts a suitable meat grinder or vegetable grinder (not shown) or ice cream freezer (not shown) or like apparatus may be mechanically connected with the horizontal shaft 13 so as to be rotated thereby at a speed determined by the setting of the transmission mechanism interposed between the motor and the driving shaft.

It will be observed that I have provided a simple and inexpensive mixer that may be used to operate a number of devices, irrespective of whether these devices require the application of power on a vertical or on a horizontal axis.

Moreover, I have provided improved speed changing gear mechanism between the motor and the operating shafts. This mechanism is of a simple and inexpensive construction, and moreover, it is inherently safe. By reason of the gear releasing mechanism it is practically impossible to overload the motor or driving mechanism.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In a mixing device and the like having a driving shaft and a driven shaft for operating food preparation tools and the like, a speed-change gear mechanism connecting said driving shaft with said tool shaft comprising a third shaft, means supporting said third shaft and mechanically connecting it with said driving shaft to give it a planetary motion with respect to said driving shaft, a plurality of gears mounted to rotate on said third shaft, driving connections between said gears, a gear on said tool shaft meshing with one of the gears on said third shaft, a plurality of gears meshing with the remaining gears on said third shaft, means selectively engaging said last named gears so as to prevent rotation thereof whereby said tool shaft can be driven at different preselected speeds from said driving shaft, and means controlling said means engaging said gears so as to release the gear that is engaged responsively to a predetermined maximum load on said driven shaft.

2. In a mixing device and the like having a housing, a driven shaft for operating food preparation tools and the like mounted on said housing and a driving shaft for said driven shaft mounted on said housing, a speed-change gear mechanism in said housing connecting said driving shaft with said tool shaft comprising a third shaft having planetary motion around said driving shaft, a driving connection between said driving shaft and said third shaft whereby said shafts are simultaneously rotated, driving shaft about its axis and the third shaft about the driving shaft, a series of gears of varying diameters arranged to rotate together and freely on said third shaft, a gear connected to drive said tool shaft and meshing with one of said gears rotating freely on said third shaft, a plurality of freely rotatable gears meshing with the remaining of said rotatable gears on said third shaft and having diameters varying in the reverse order, said last-named gears nesting together compactly in said housing, means within said housing for selectively engaging the last-named gears to prevent their rotation, a control member accessible on the exterior of said housing controlling said last named means, and means controlling said means engaging said gears independently of said control member so as to release the gear that is engaged responsively to a predetermined maximum load on said driven shaft.

3. In a mixing device and the like having a housing, a shaft for operating food preparation tools and the like carried by said housing, and a driving shaft for said tool shaft carried by said housing, a speed-change gear mechanism in said housing connecting the driving shaft with said tool shaft comprising a third shaft, means mounting said third shaft for planetary motion around said driving shaft, a gear on said third shaft provided with a series of engaging teeth constituting a plurality of gears having different diameters, a gear meshing with one of said gears, a driving connection between said tool shaft and said last-named gear, a series of freely rotatable gears engaging the remaining of said first-named series of gears and having diameters varying in the reverse order, cam operated locking means within said housing operable to selectively prevent rotation of said last-named series of gears to establish a driving connection between said driving shaft and said food tool shaft, a shaft carried by said housing for operating said cam means, a control member for said shaft accessible on the exterior of said housing, and means in said housing for releasing said locking means in accordance with the load imposed on said tool shaft.

4. In a mixing device having a housing, a driving shaft extending into said housing, a shaft mounted in said housing and extending therefrom arranged to drive food preparation tools and the like, a speed-change gear mechanism in said housing between said driving shaft and said tool shaft including a third shaft, a support for said third shaft mounted in said housing to rotate with said driving shaft arranged to give said third shaft a planetary motion around said driving shaft, a series of gears having progressively decreasing diameters arranged to rotate in unison on said third shaft, a driving member connected to operate said tool shaft, said driving member being provided with an internal gear meshing with one of said series of gears, a plurality of members nested together and having internal gears meshing with the remaining of said series of gears, latching means within said housing arranged to lock said members against rotation, cam means within said housing controlling said latching means, a shaft carried by said housing controlling the operation of said cam means to selectively lock said members against rotation, a member accessible on the exterior of said housing for operating said shaft to its successive operating positions, and means in said housing providing for the release of said latching means in accordance with the load imposed on said tool shaft.

DAVID C. PRINCE.